United States Patent [19]

Reiser et al.

[11] Patent Number: 4,659,635
[45] Date of Patent: Apr. 21, 1987

[54] ELECTROLYTE MATRIX IN A MOLTEN CARBONATE FUEL CELL STACK

[75] Inventors: Carl A. Reiser; Donald L. Maricle, both of Glastonbury, Conn.

[73] Assignee: The United States of America as represented by the United States Department of Energy, Washington, D.C.

[21] Appl. No.: 867,123

[22] Filed: May 27, 1986

[51] Int. Cl.$^4$ .............................................. H01M 8/14
[52] U.S. Cl. ........................................ 429/41; 429/44; 429/46
[58] Field of Search ..................... 429/41, 44, 45, 46, 429/16

[56] References Cited

U.S. PATENT DOCUMENTS

| | | | |
|---|---|---|---|
| 3,481,788 | 12/1969 | Hamlen et al. | 429/45 X |
| 3,867,206 | 2/1975 | Tracciola et al. | 429/41 X |
| 4,526,845 | 7/1985 | Reiser et al. | 429/41 |
| 4,548,877 | 10/1985 | Jacovangelo et al. | 429/41 |
| 4,579,788 | 4/1986 | Marianowski et al. | 429/16 |
| 4,596,751 | 6/1986 | Kunz | 429/41 |

Primary Examiner—Anthony Skapars
Attorney, Agent, or Firm—Hugh W. Glenn; Robert J. Fisher; Judson R. Hightower

[57] ABSTRACT

A fuel cell stack is disclosed with modified electrolyte matrices for limiting the electrolytic pumping and electrolyte migration along the stack external surfaces. Each of the matrices includes marginal portions at the stack face of substantially greater pore size than that of the central body of the matrix. Consequently, these marginal portions have insufficient electrolyte fill to support pumping or wicking of electrolyte from the center of the stack of the face surfaces in contact with the vertical seals. Various configurations of the marginal portions include a complete perimeter, opposite edge portions corresponding to the air plenums and tab size portions corresponding to the manifold seal locations. These margins will substantially limit the migration of electrolyte to and along the porous manifold seals during operation of the electrochemical cell stack.

17 Claims, 6 Drawing Figures

ELECTROLYTE MATRIX IN A MOLTEN CARBONATE FUEL CELL STACK

CONTRACTUAL ORIGIN OF THE INVENTION

The United States Government has rights in this invention pursuant to Contract No. DE-AC01-79ET15440 between the U.S. Department of Energy and United Technologies Corporation.

BACKGROUND OF THE INVENTION

This invention relates to fuel cells and fuel cell stacks particularly those that employ molten alkali metal carbonate electrolyte.

Molten carbonate fuel cells and stacks of such cells are well known and described in various prior publications and patents. For example, U.S. Pat. No. 4,478,776 to Maricle et al. and U.S. Pat. No. 4,411,968 to Reiser et al. illustrate typical fuel cells and stacks of such cells. Porous, sintered nickel-chromium anodes and porous nickel oxide cathodes are disposed on opposite major surfaces of a porous electrolyte matrix. A matrix of such as lithium aluminate ($LiAlO_2$), or other inert ceramic is filled with molten alkali metal carbonate electrolyte, (e.g. $Li_2CO_3/K_2CO_3$) in each cell in a fuel cell stack. Stacks with several hundred fuel cells are contemplated in a typical power supply.

The management of electrolyte within a stack of molten carbonate fuel cells has become a major developmental issue. Molten carbonate electrolyte has high surface tension and forms extensive films at the face surfaces of the stack. Although the exact mechanism is not completely understood, it is believed that an electrolytic pumping action results from electrochemical reactions driven by the stack voltage. This pumping action can cause electrolyte migration along the stack face and through the manifold seals which extend from the positive to the negative end of the stack along the edges of the individual cells. The edges of the individual cells when taken together comprise the stack surface. The result is to dry out the cells at the positive end and flood the cells at the negative end of the stack. In addition, corrosion products can be transported with the electrolyte and deposited at the negative end of the stack. These effects may result in electronic shorts and other conditions that can severely impair the stack performance.

In a fuel cell stack, the electrolyte filled matrix typically will extend to the edge of the stack at all faces to provide a good seal between reactant gases. Unfortunately, this provides a path for molten electrolyte to migrate to the stack surfaces where the manifold seals are located. At the stack surfaces (two of the four), exposed to oxidant gas, this problem is acerbated by the electrochemical pumping of electrolyte through the edge of the matrix. The pumping can be caused by oxygen reduction on exposed metal surfaces in accordance with the reaction:

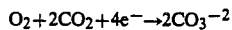

Hydrogen oxidation at the anode side of the cell can occur by reaction with carbonate:

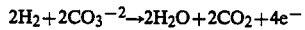

These reactions can result in the accumulation of molten carbonate on the air side surfaces of the stack in excess of the amount that would accumulate due only to capillary wicking.

Various attempts have been made to reduce this electrolyte migration. However, such attempts have not proven completely successful but have resulted in unwanted complication of the cell and stack structure.

Therefore, in view of the above it is an object of the present invention to provide an improved molten carbonate fuel cell to limit electrolyte migration from the central body to the edge of the cell.

It is also an object to provide a fuel cell that limits electrolyte migration while providing adequate seals between anode and cathode chambers.

It is a further object of the invention to provide a fuel cell stack with limited electrolyte migration along the manifold seals and stack face surfaces.

It is likewise an object to provide a fuel cell stack with restrained electrolyte pumping to the oxidant face of the fuel cell stack.

SUMMARY OF THE INVENTION

In accordance with the present invention, there is provided an improved porous matrix for containing molten carbonate electrolyte in a fuel cell stack. The porous matrix comprises a substantially flat sheet of porous ceramic material having a first pore size average in the central body of the sheet and a second pore size average in the marginal portions of the sheet. The first pore size average in the central body is substantially smaller than the second pore size average in the marginal portions. The larger pore sizes in the margins on wetting with molten carbonate leave void a major portion of the internal porosity. In contrast, the pores in the central body of the matrix are sufficiently small to cause filling of a major portion of the central body on wetting with molten carbonate.

In one form of the invention, the marginal portions comprise a closed perimeter around the central body of the porous matrix.

In other aspects of the invention, the central body of the matrix is of an inert ceramic such as lithium aluminate, ceria, lithium zirconate or stabilized zirconia while the marginal portions of the matrix are a ceramic felt such as zirconia, lithium aluminate, lithium zirconate or alumina. The central body of the matrix has an average pore size of between 0.15 and 0.3 microns while the marginal portions have an average pore size between 15 and 100 microns.

In further aspects of the invention, two oppositely disposed margins of the larger pore size are aligned with stack faces exposed to oxidant gas, but the central body of the matrix with the smaller pore size extends to two other edges of the matrix exposed to fuel and product gases.

In yet, other aspects of the invention, the marginal portions of large pore size are placed only at the corner segments of the porous matrix in alignment with the manifold sealing members engaging the gas manifolds.

In one other specific aspect of the invention, the marginal portions of large pore size are of a different ceramic material than the central body of the a matrix and are attached to the central body by lengthwise strips underlapping portions of both the margins and the central body.

The present invention also contemplates a fuel cell stack with a plurality of fuel cells forming face surfaces at their edges. The face surfaces are adapted to receive plenums for supplying or withdrawing reaction gases.

Porous sealing members or gaskets are placed at the face surfaces for sealing the gas plenums into engagement with the cells in the stack. Individual cells include a porous matrix for containing molten electrolyte positioned to separate the anode and cathode members and to conduct ionic currents between them. The matrix is a thin flat sheet having a central body with a first pore size and an outer margin of substantially larger pore size than that of the central body. The outer margins of larger pore size can form a closed perimeter about the matrix sheet or alternatively, correspond only to the manifold sealing members at the stack faces. In other arrangements, the large pore size margins are aligned with the sealing members and with the oxidant gas plenums to limit electrolyte migration. Other matrix sheet edges can be of the smaller pore size to minimize cross leakage of reactant gases between the electrodes.

DETAILED DESCRIPTION OF THE DRAWING

The present invention is illustrated in the accompanying drawings wherein.

DETAILED DESCRIPTION OF THE PREFERRED EMBODIMENT

The electrolyte matrix of the present invention is prepared as a substantially flat sheet of porous ceramic material. The sheet will correspond to the shape of the fuel cell stack. In a typical stack it will be of square or rectangular shape. A rectangular stack can be provided with four plenums, one at each face, for introducing and withdrawing the two reactant gases. Such a stack is illustrated in U.S. Pat. No. 4,411,968 to Reiser et al.

Various embodiments of the electrolyte matrix of the present invention are illustrated in FIGS. 1-5. In each Figure, an electrolyte matrix 11 is provided with a central body and with marginal portions having substantially larger pore size than that of the central body. The larger pore size in the marginal portions will prevent these portions from completely filling with electrolyte. Consequently, wicking and electrochemical pumping of the molten electrolyte to the stack face is minimized.

Figure 1:
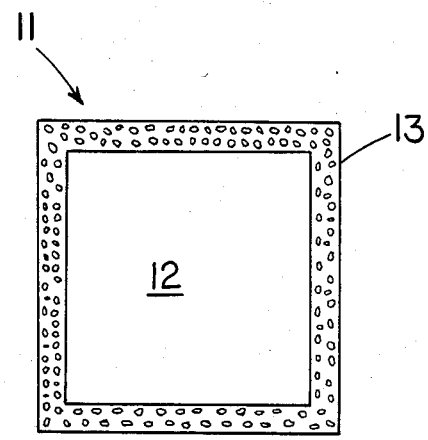
FIG. 1 is a schematic illustration of an electrolyte matrix sheet with marginal portions.
Figure 2:
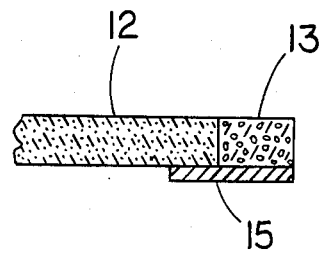
FIG. 2 is a fragmentary view in cross-section of the FIG. 1 electrolyte matrix showing detail at the interface between the matrix sheet and the marginal portion.

In FIG. 1, the marginal portions 13 form a complete perimeter around the central body 12 of the matrix. Portions 13 can be affixed to the matrix as shown in FIG. 2 by tape or other suitable underlapping layer 15 that adheres to both the matrix body 12 and to the marginal portion 13. Layer 15, preferably, is of a polymeric material that will decompose to vapor or otherwise burn off on heat up to the molten carbonate temperature.

Figure 3:
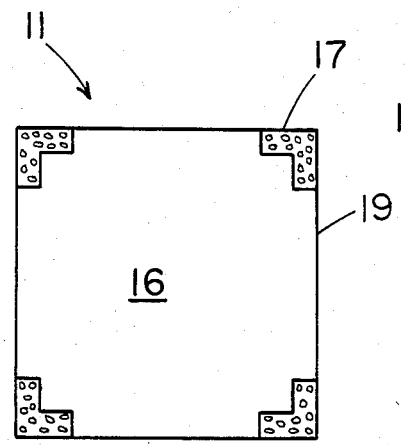
FIG. 3 is an illustration of one other arrangement of marginal portions on an electrolyte matrix sheet.

In FIG. 3, marginal tabs 17 are illustrated only at corner portions of the matrix. The small pore size of the central body 16 extends outwardly to edge surfaces 19 of the electrolyte matrix. The marginal tabs are positioned to correspond and contact vertical seals at the fuel cell stack face. Advantageously, this arrangement is expected to limit electrolyte flow from the matrix to the vertical seals while minimizing cross-leaking of reactant gases. The small pore size matrix at edges 19 will fill with molten electrolyte to limit cross leakage but yet, will not contact and conduct molten electrolyte to the manifold seals where electrolyte migration along the stack is expected to occur.

Figure 4:
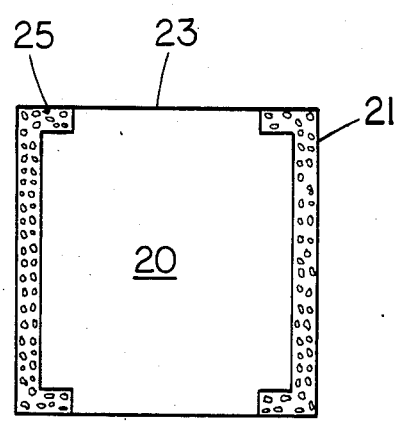
FIG. 4 is another illustration of marginal portions on an electrolyte matrix sheet.

Another arrangement is shown in FIG. 4 where marginal portions 21 extend along opposite sides of the matrix and the central matrix body 20 of small pore size extends to the alternate edges 23. In addition, corner tabs 25 of the larger pore size are arranged to correspond with the manifold seals at the end portions of edges 23. This arrangement advantageously is aligned in the fuel cell stack, such that the marginal portions 21 of increased pore size correspond to cell stack faces exposed to oxidant reactant. Electrolytic pumping of the electrolyte caused by the oxygen reduction at exposed metal surfaces, thus can be limited by separating the electrolyte filled matrix body 20 from the oxygen gas plenums. The electrolyte filled matrix at edges 23 will be found to provide an effective seal against cross leakage at the fuel and product gas manifolds.

Figure 5:
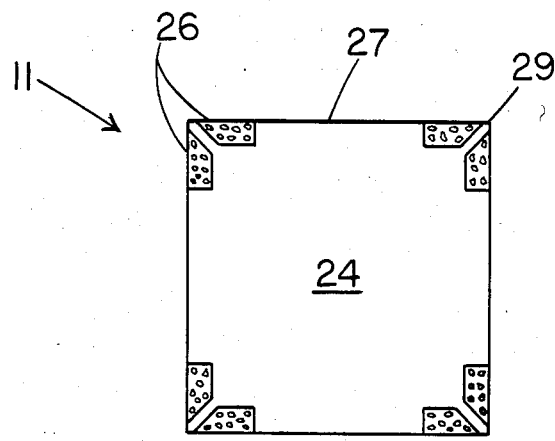
FIG. 5 is an electrolyte matrix with another arrangement of marginal portions.

In FIG. 5, matrix 11 is illustrated only with tab portions 26 of increased pore size. All other edge surfaces 27, including corner segments 29, are the small pore size of the electrolyte matrix body 24. Tabs 25 are aligned to correspond with the eight manifold seals that extend from the positive to the negative ends of a four manifold, fuel cell stack. This arrangement leaves all other edge surfaces 27 and 29 of small pore size substantially filled with electrolyte to provide good seals between the electrodes and the stack.

In each of the embodiments described above, the central body of the matrix can be made in accord with established procedures for forming ceramic matrices. An example of one such method is given in U.S. Pat. No. 4,478,776 to Maricle et al. In this tape forming method, inert particles of, for instance, lithium aluminate of about 1 micron in size are used to produce a fine pore size of about 0.15 to 0.3 microns average. Larger corrosion resistant particles, e.g. alumina, of about 25 microns size may be included to resist crack formation. The inert particles are mixed with a temporary plastic binder to improve handleability in the tape formation steps. A polymer or plastic binder that decomposes at the molten carbonate operating temperature, for instance, polyvinyl butyral can be selected. Various other plasticizers and other modifiers, such as a flow control agent can be added to the polymer as required. These materials can be thouroughly mixed in such as a ball mill with organic solvents and cast into a tape to which the above described marginal portions can be applied. Although lithium aluminate is the preferred inert material for the matrix, other materials inert to molten carbonate electrolyte, such as stabilized zirconia, ceria, lithium zirconate, etc. also may be used.

The marginal portions can be applied to the electrolyte matrix body as illustrated above in FIG. 2. A preferred material for the marginal portions is zirconia felt, which is stable at molten carbonate fuel cell conditions. Often, zirconia is stabilized with yttria or calcia. One suitable zirconia felt is available as type ZYL-100A from the Zircar Corporation. Other suitable materials for the marginal portions include felts or mats of lithium aluminate, lithium zirconate or alumina.

The marginal portions of the electrolyte matrix are provided with sufficiently large pore sizes throughout, such that on wetting the internal surfaces thereof with molten electrolyte, the margins remain void of electrolyte in a major portion of their porous volume. Average pore sizes of about 15 to 100 microns are contemplated throughout the margins for this purpose. These pore sizes are substantially larger than the pore sizes of 0.15 to 0.3 microns average present in the matrix body. These smaller pore sizes are sufficient to result in substantial filling of the matrix porous volume on exposure to molten alkali metal carbonate.

Figure 6:
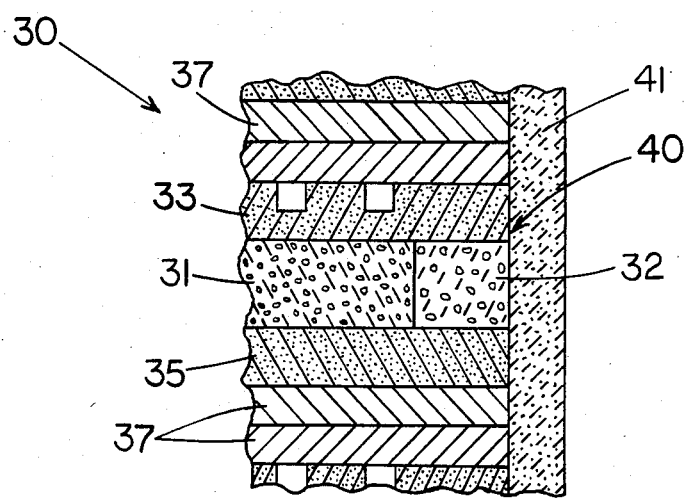
FIG. 6 is a fragmentary cross-section of a fuel cell stack with the electrolyte matrix of the invention.

Referring now to FIG. 6, where an electrolyte matrix, of the present invention is illustrated in a fuel cell stack 30. Matrix 31 is disposed between an anode 33 and cathode 35 of a fuel cell unit. The fuel cells are separated by electrolyte impermeable, electrically conductive separator sheets 37. Sheets 7 may be provided in two layers of different metals to be inert to both the anode and the cathode environments.

Electrolyte matrix 31 extends outwardly to the stack face 40 but includes marginal portions 32 at inboard regions of the stack face. Marginal portions 32 as described above are of substantially greater pore size than the central body of the electrolyte matrix 31. Accordingly, only the central body of the matrix 31 is filled with electrolyte and marginal portions 32 include large pore, inboard regions without electrolyte fill to impede electrolyte transfer to a stack face 40 and to the vertical seals illustrated at 41.

Therefore, it is seen that the present invention provides an improved molten carbonate fuel cell stack to limit electrolyte migration from the body of the electrolyte matrix to the stack face. By appropriately designing the marginal portions, good gas seals can be obtained between the electrodes of the fuel cell stack. The electrolyte matrix of this invention will be seen to restrain electrolyte transfer to the manifold seals at the stack face and thereby limit electrolyte migration from the positive to the negative ends of the stack.

Although the present invention has been described in terms of specific materials, procedures and structure, it will be clear to one skilled in the art that various changes can be made within the scope of the attached claims.

The embodiments of this invention in which an exclusive property or privilege is claimed are defined as follows:

1. A porous matrix for containing molten carbonate electrolyte in a high temperature fuel cell comprising
   a substantially flat sheet of porous ceramic material having a central body with a first pore size average and marginal portions with a second pore size average, said first pore size average being substantially smaller than said second pore size average.

2. The porous matrix of claim 1 wherein said first pore size average being of sufficiently small size to result in the filling of a major portion of the central body porosity on wetting of ceramic particles therein with molten carbonate electrolyte, and the second pore size average being of sufficiently large size to permit wetting of ceramic particles therein with a major portion of the porosity remaining void of molten carbonate electrolyte.

3. The porous matrix of claim 1 wherein said central body is of a particulate ceramic selected from the group consisting of lithium aluminate, lithium zirconate ceria and zirconia, and wherein the marginal portions are of a ceramic material selected from the group consisting of zirconia, lithium aluminate lithium zirconate and alumina.

4. The porous matrix of claim 3 wherein the central body is of lithium aluminate and the marginal portions are of zirconia felt.

5. The porous matrix of claim 3 wherein said first pore size is in a range of about 0.15 and 0.30 microns average and wherein said second pore size is in a range of about 15 and 100 microns average.

6. The porous matrix of claim 1 wherein said marginal portions comprise marginal strips along at least two edge lengths of said sheet.

7. The porous matrix of claim 6 wherein said marginal portions of second pore size comprise two oppositely disposed edge lengths but wherein two other oppositely disposed edge lengths are of said first pore size.

8. The porous matrix of claim 1 wherein said marginal portions comprise tabs at corner portions of said sheet.

9. The porous matrix of claim 8 wherein the marginal portions of second pore size are placed only at corner portions of said sheet.

10. The porous matrix of claim 1 wherein said marginal portions comprise a closed perimeter about the central body of the sheet.

11. The porous matrix of claim 1 wherein said marginal portions are of a different ceramic material than that of said central body and are attached to said central body by lengthwise strips underlapping portions of both the marginal portions and the body.

12. In a fuel cell stack comprising a plurality of fuel cells with edges arranged to form face surfaces of said stack adapted to receive plenum means for supplying and withdrawing reactant gases, porous sealing means between said face surfaces and plenum means, and individual cells in said plurality of cells including a porous matrix for containing molten electrolyte, the improvement comprising a porous matrix shaped as a flat sheet extending substantially across the length and width of a fuel cell, said matrix having a first pore size in the central body thereof and a second pore size in the marginal portions thereof, said first pore size being substantially smaller than the second pore size such that on wetting internal surfaces of the porous matrix with molten carbonate electrolyte, the porosity of the central body is substantially filled with molten electrolyte and the porosity of the marginal portions is mostly void of molten carbonate electrolyte.

13. The fuel cell stack of claim 12 wherein the porous matrix in the central body is of particulate lithium aluminate and the porous matrix at the marginal portions is of zirconia felt.

14. The fuel cell stack of claim 12 wherein said marginal portions of second pore size extend to the stack face at edge surfaces thereof corresponding to plenums for containing oxidant gases.

15. The fuel cell stack of claim 12 wherein said marginal portions of second pore size are only at edge surfaces of said ceramic corresponding and contiguous to the sealing means between face surfaces and plenums.

16. The fuel cell stack of claim 12 wherein the marginal portions of second pore size form a closed perimeter inboard of the outer edges of the porous matrix for molten electrolyte.

17. The fuel cell stack of claim 12 wherein the porous matrix of individual fuel cells at the face surfaces of the stack include marginal portions of second pore size in engagement with said porous sealing means and include edge portions of first pore size spaced from said sealing means.

* * * * *